(12) United States Patent
Dittmar

(10) Patent No.: US 11,761,488 B2
(45) Date of Patent: Sep. 19, 2023

(54) ROTATABLE SHIELD FOR WHEEL BEARING ASSEMBLIES

(71) Applicant: AKTIEBOLAGET SKF, Gothenburg (SE)

(72) Inventor: Rico Dittmar, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 48 days.

(21) Appl. No.: 17/535,660

(22) Filed: Nov. 25, 2021

(65) Prior Publication Data

US 2023/0160435 A1    May 25, 2023

(51) Int. Cl.
| | | |
|---|---|---|
| *F16C 33/80* | (2006.01) | |
| *B60B 27/00* | (2006.01) | |
| *F16C 33/78* | (2006.01) | |

(52) U.S. Cl.
CPC ........ *F16C 33/805* (2013.01); *B60B 27/0073* (2013.01); *F16C 33/783* (2013.01); *F16C 33/7886* (2013.01); *F16C 33/7896* (2013.01); *F16C 2326/02* (2013.01)

(58) Field of Classification Search
CPC ................ F16C 33/783; F16C 33/7886; F16C 33/7896; F16C 33/80; F16C 33/805; F16C 2326/02; B60B 27/0073
See application file for complete search history.

(56) References Cited

U.S. PATENT DOCUMENTS

| | | | | |
|---|---|---|---|---|
| 3,361,497 A | * | 1/1968 | Stengel .................. | F16C 33/66 |
| | | | | 277/412 |
| 4,101,180 A | * | 7/1978 | Anderson ............... | F16C 33/80 |
| | | | | 295/35 |
| 5,259,628 A | * | 11/1993 | Nisley .................... | F16C 33/80 |
| | | | | 384/480 |

(Continued)

FOREIGN PATENT DOCUMENTS

| | | | | | |
|---|---|---|---|---|---|
| JP | 2012013182 A | * | 1/2012 | ............... | F16H 7/20 |
| JP | 2013167316 A | * | 8/2013 | ............ | F16C 33/783 |

OTHER PUBLICATIONS

Machine Translation of JP-2012013182-A (Year: 2012).*

(Continued)

*Primary Examiner* — Alan B Waits
(74) *Attorney, Agent, or Firm* — J-TEK LAW PLLC; Scott T. Wakeman; Mark A. Ussai

(57) ABSTRACT

A wheel bearing assembly includes a fixed inner axle with at least one inner race, a rotatable outer hub disposed about the axle and having at least one outer race and rolling elements disposed between the inner and outer races. An annular seal is disposed between the axle and the hub and is located adjacent to the inner and outer races. A shield is spaced axially from the seal such that the seal is disposed between the rolling elements and the shield. The shield includes a rigid annular body having an outer radial end coupled with the outer hub, preferably by a plurality of couplers, and an inner radial end defining a central opening (Continued)

for receiving the axle and located adjacent to the inner axle or a component disposed upon the axle. As such, the annular body substantially obstructs an annular interior space to prevent substances from contacting the seal.

19 Claims, 10 Drawing Sheets

(56) References Cited

U.S. PATENT DOCUMENTS

| | | | | |
|---|---|---|---|---|
| 5,651,617 | A * | 7/1997 | Danielsson | B60B 27/001 |
| | | | | 384/585 |
| 10,514,059 | B2 * | 12/2019 | Takarabe | F16C 19/364 |

OTHER PUBLICATIONS

Machine Translation of JP-2013167316-A (Year: 2013).*
Unpublished U.S. Appl. No. 17/373,941.
Unpublished U.S. Appl. No. 17/373,954.

* cited by examiner

ROTATABLE SHIELD FOR WHEEL BEARING ASSEMBLIES

BACKGROUND OF THE INVENTION

The present invention relates to bearings, and more particularly to wheel bearing assemblies.

Wheel bearing assemblies, particularly for mounting wheels to vehicles such as trucks, typically include an outer hub connectable to the wheel and an inner axle mounted to a vehicle frame. The bearings are often double-row tapered rollers disposed between the outer hub and the inner axle and enable the hub, and thereby the wheel, to rotate about a central axis extending through the fixed axle. As such bearings are generally exposed to contaminants such as dust, mud, oil, metal shavings, etc., which may damage the bearings if contacting the rolling elements or the bearing raceway surfaces, one or more seals are provided adjacent to the raceways to exclude such contaminants. When operating in particularly extreme environments, these seals may become damaged through repeated contact or exposure to such contaminants, necessitating replacement of the seals.

SUMMARY OF THE INVENTION

In one aspect, the present invention is a wheel bearing assembly comprising a fixed inner axle having a central axis and at least one bearing inner race. A rotatable outer hub has a central bore, the inner axle being disposed within the hub central bore such that an annular interior space is defined between the inner axle and the outer hub, and at least one bearing outer race disposed radially about the at least one bearing inner race. A plurality of rolling elements are disposed between the at least one inner race and the at least one outer race so as to rotatably couple the outer hub with the inner axle. An annular seal is disposed between the inner axle and the outer hub and is located adjacent to the inner race and to the outer race. Further, a shield is spaced axially from the seal such that the seal is disposed between the plurality of rolling elements and the shield. The shield includes a rigid annular body having an outer radial end coupled with the outer hub and an inner radial end, the inner radial end defining a central opening for receiving the axle and being located adjacent to the inner axle or a component disposed upon the axle. As such, the annular body is configured to substantially obstruct a section of the annular interior space to prevent substances from contacting the seal.

In another aspect, the present invention is again a wheel bearing assembly as described in the preceding paragraph and further comprising at least one coupler connected with the annular body outer end and configured to connect the annular body with the outer hub such that at least one drain passage is defined between the rigid annular body and the outer hub.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
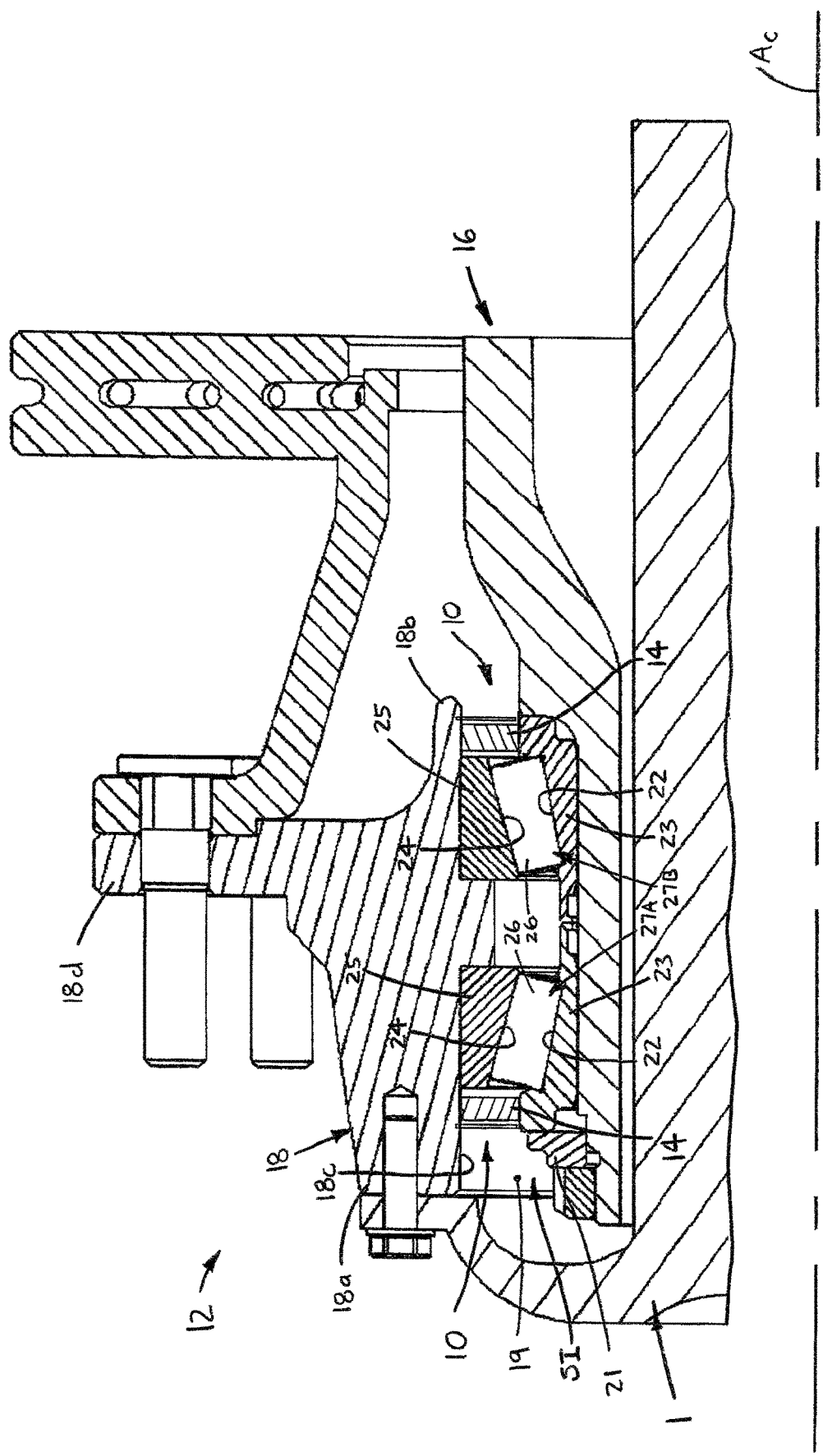
FIG. 1 is an axial cross-sectional view of an upper portion of a wheel bearing assembly having two shields in accordance with a first construction of the present invention, shown with an inner axle disposed about a rotatable central shaft.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. Further the term "axle" is intended to include an inner axle 16 as described below and any component mounted on the axle 16 and the term "hub" is intended to include an outer hub 18 as described below and any component mounted within the hub 18. The terminology includes the words specifically mentioned above, derivatives thereof, and words of similar import.

Referring now to the drawings in detail, wherein like numbers are used to indicate like elements throughout, there is shown in FIGS. 1-17 a secondary seal or "shield" 10 for a wheel bearing assembly 12, the shield 10 functioning to prevent substances (e.g., contaminants) from contacting or passing to a primary seal 14. The wheel hub assembly 12 is preferably optimized for use in an electrically powered or "electric" truck and basically comprises a fixed inner axle 16, a rotatable outer hub 18 disposed about the inner axle 16, a plurality of rolling elements 26 rotatably coupling the axle 16 and the hub 18, at least one primary seal 14 and at least one shield 10. More specifically, the inner axle 16 is fixedly connected with a vehicle frame (not shown) and has a central axis $A_C$, an outer circumferential surface 16a and at least one and preferably two bearing inner races 22. The inner races 22 are each preferably provided by a separate bearing inner ring 23 disposed about the axle 16 and retained thereon by a nut 21, but may alternatively be formed directly on the axle outer surface 16a. The outer hub 18 is connected with a drive shaft 1, has a flange portion 18d connected with a wheel (not shown) and is connected with a steering mechanism and/or a suspension assembly (neither shown). The hub 18 has a central bore 19, the axle 16 being disposed within the hub central bore 19 such that an annular interior space $S_1$ is defined between the inner axle 16 and the outer hub 18, and at least one and preferably two outer races 24 each disposed radially about a separate one of the inner races 22. Each outer race 24 is preferably provided by a separate bearing outer ring 25 disposed within the hub bore 19, but may alternatively be directly formed on the hub inner surface 18c defining the bore 19.

Further, a plurality of rolling elements 26 are disposed between the at least one inner race 22 and the at least one outer race 26 so as to rotatably couple the outer hub 18 with the inner axle 16. Preferably, two sets or "rows" 27A, 27B of the rolling elements 26 are each disposed between a separate pair of aligned inner and outer races 22, 24, such that the wheel bearing assembly 12 is a "double row" bearing, as depicted in FIG. 1. The rolling elements 26 are preferably tapered rollers as shown in FIG. 1, but may alternatively be any other known type of rolling element, such as balls, cylindrical rollers, spherical rollers, needles, etc.

Furthermore, the wheel hub assembly 12 preferably includes two of the primary seals 14, each seal 14 being disposed between the inner axle 16 and the outer hub 18 and located adjacent to a separate one of the inner races 22 and the associated outer race 24. Specifically, each primary seal 14 is located axially "outward" of each rolling element row 27A, 27B and a proximal axial end 18a, 18b of the outer hub 18 and functions to both retain lubricant about, and prevent contaminants from contacting, the rolling elements 26 and the inner and outer races 22, 24. Each seal 14 may be coupled with the inner axle 16 and configured to seal against the hub bore 19 or a component disposed within the bore 19, such as a bearing outer ring 25, or each seal 14 may be coupled with the outer hub 18 and configured to seal against the axle 16 or a component disposed about the axle 16, such as one of the bearing inner rings 23, a nut 21, etc.

Also, each primary seal 14 is depicted in the present application as a generic "block" element in the drawing figures without any specific details as each seal 14 may be formed in any appropriate manner. For example, each seal 14 may be formed as a radial lip seal including one or more radially-extending sealing lips, as an axial "face" seal with one or more axially-extending sealing lips, a combination seal with both radial and axial sealing lips, a seal with a single case or with both inner and outer cases forming a "cassette", etc. The present invention encompasses all known types of seals and is not limited to any particular structure of the primary seal(s) 14.

Still referring to FIGS. 1-18, the wheel hub assembly 12 preferably includes two of the shields 10 each spaced axially from a separate one of the primary seals 14, such that each seal 14 is disposed between one row 27A or 27B of rolling elements 26 and the adjacent shield 10, as best shown in FIG. 1. However, the wheel hub assembly 12 may include only one shield 10 located between one seal 14 and the axial end 18a or 18b of the hub 18 which is most likely to experience an ingress of contaminants or any other substances. In any case, each shield 10 basically includes a rigid annular body 30 with a central opening 31 for receiving a portion of the inner axle 16 and at least one and preferably a plurality of couplers 32.

Specifically, the annular body 30 has an outer radial end 30a coupled with the outer hub 18, such that the shield 10 rotates with the hub 18 about the central axis $A_C$, and an inner radial end 30b. The inner radial end 30b defining the central opening 31 (FIGS. 4 and 5) for receiving a portion of the axle 16 and being located radially adjacent or proximal to the inner axle 16 or a component (e.g., a bearing inner ring 23) disposed about the axle 16. The inner radial end 30b may be sized so as to be spaced radially outwardly from the inner axle 16, or from a bearing inner ring 23, a nut 21 or a washer 28 (FIG. 17) disposed about the axle 16, so as to define an annular labyrinth gap 36 between the shield 10 and the axle 16. Alternatively, the axle 16, the inner ring 23, the nut 21 or the washer 28 may be formed with an annular groove 37 and the inner radial end 30b of the rigid annular body 30 may be sized so as to be disposed within the groove 37 and define a generally U-shaped labyrinth gap 38. In either case, each rigid annular body 30 is configured to substantially obstruct a section of the annular interior space $S_1$ to prevent substances from contacting the proximal seal 14, as discussed in further detail below.

Figure 6:
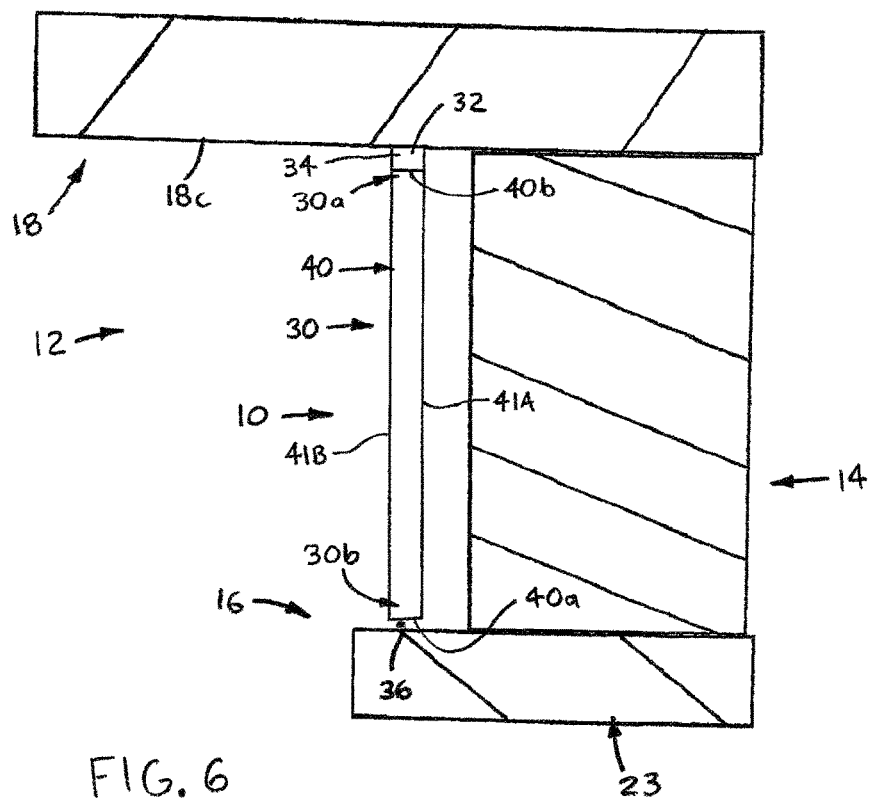
FIG. 6 is an axial cross-sectional view of the first construction shield disposed between a bearing inner ring and an outer hub, shown with couplers frictionally engaged with an inner surface of the hub.

Further, the one or more couplers 32 are each connected with the outer radial end 30a of the rigid annular body 30, and preferably a plurality of the couplers 32 are spaced circumferentially about the body outer radial end 30a. The coupler(s) 32 is/are configured to connect the rigid annular body 30 with the outer hub 18 such that at least one and preferably a plurality of drain passages 34 is/are defined between the rigid annular body 30 and the outer hub 18, which enables the expulsion of substances (i.e., contaminants) located between the shield 10 and the seal 14, as described below. In certain constructions as shown in FIGS. 1-3 and 7-17, the outer hub 18 or a component disposed within the hub 18 (e.g., one of the bearing outer rings 25)

includes an annular groove 33 and at least a portion of each coupler 32 is disposed within the annular groove 33, to thereby couple the shield 10 with the outer hub 18. In other constructions as depicted in FIG. 6, the one or more couplers 32 are each configured to frictionally engage with the inner circumferential surface 18*c* of the outer hub 18, or with the inner circumferential surface 25*a* (FIG. 2) of one of the bearing outer rings 25, to couple the shield 10 with the outer hub 18.

Figure 3:
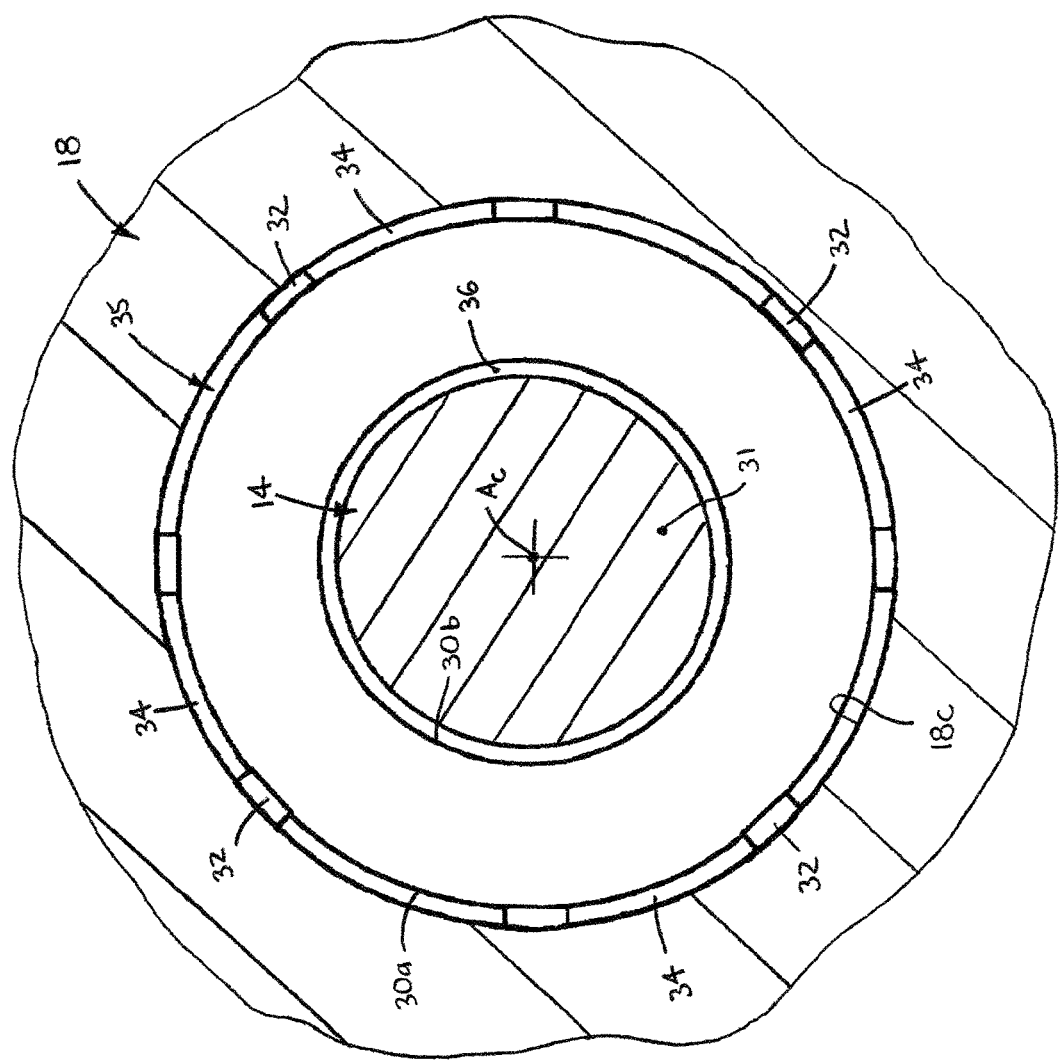
FIG. 3 is a view through line 3-3 of FIG. 2.
Figure 4:
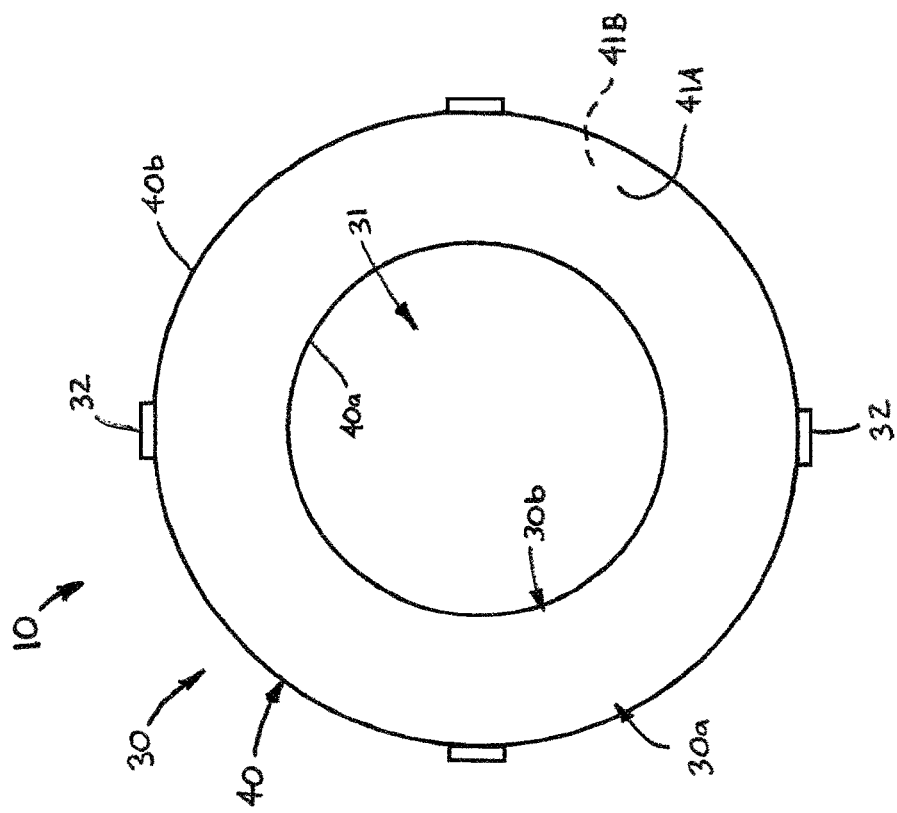
FIG. 4 is a side plan view of the first construction shield shown with eight couplers.
Figure 5:
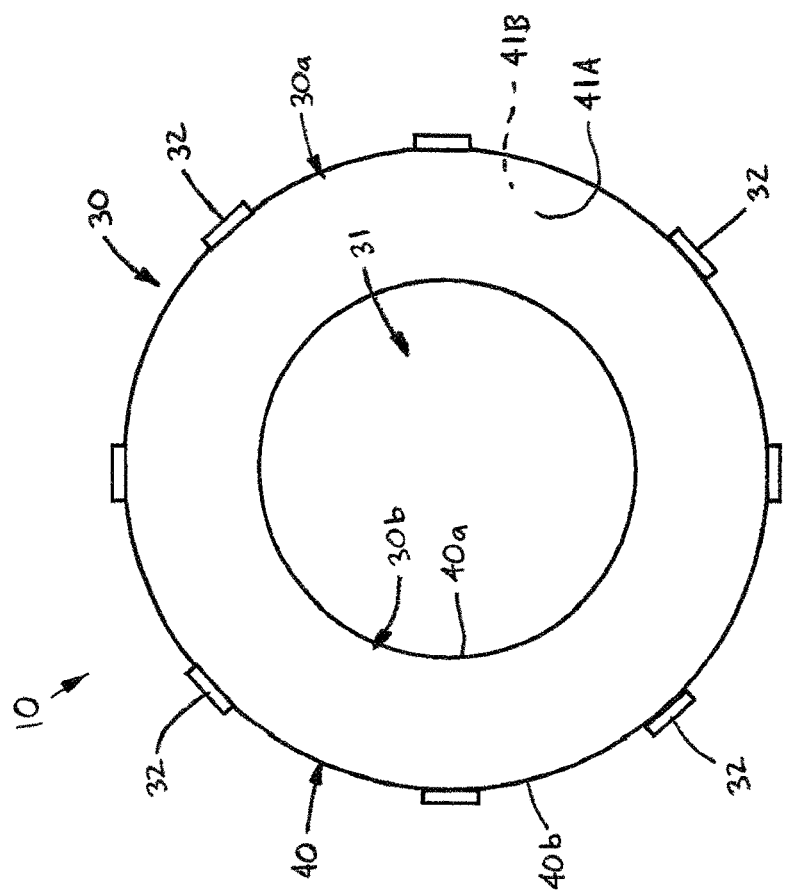
FIG. 5 is another side plan view of the first construction shield shown with four couplers.

In either case, the coupler(s) 32 retain the shield 10 to the outer hub 18 such that the outer radial end 30*b* of the rigid annular body 30 is spaced radially inwardly from the inner surface 18*c* of the hub 18, or the inner surface 25*a* of one bearing outer ring 25 (or other component disposed within the hub bore 19), such that an annular space 35 is defined between the shield 10 and the outer hub 18, as best shown in FIG. 3. The drain passages 34 are provided by arcuate sections of the annular space 35 between each circumferentially adjacent pair of couplers 32, as indicated in FIG. 3. Further, each coupler 32 is preferably formed as an arcuate projection with generally rectangular axial cross-sections, but may be formed in any other appropriate manner, such as for example, a bendable clip, etc.

Preferably, the rigid annular body 30 of the shield seal 10 is integrally formed, i.e., of one-piece construction, but may alternatively be formed of a plurality of separate components formed in one of the structures as described in detail below and connected by any appropriate means. The coupler(s) 32 are preferably integrally formed with the rigid annular body 30, but may instead be formed of one or more separate components attached to the annular body 30, such as attached clips, etc. Further, the annular body 30 is preferably formed of a molded polymeric material, but may be formed of a metallic material, such as for example, a stamped or sintered steel, or any other appropriate material.

With the structure described above, each shield 10 serves to both increase the sealing efficiency of the primary seal 14 and to extend or prolong the functional life of the seal 14 by preventing or at least reducing the amount or volume of external contaminants, such as dust, metal particles, oil, water, etc., or any other substances which may contact the seal 14. That is, by providing a barrier which substantially blocks or obstructs the annular space $S_1$ between the outer hub 18 and the inner axle 16, the amount of liquid and solid contaminants passing through the annular space $S_1$ and contacting each seal 14 is substantially reduced, some of which, particularly metal particles, can readily damage any elastomeric portions of the seal 14. By being spaced from the inner axle 16 and only coupled with the outer hub 18, the shield 10 provides substantial sealing without increasing friction within the wheel hub assembly 12. Further, by providing the drain passages 34, at least some of any contaminants which pass through the narrow gap 36 or 38 between the shield 10 and the axle 16 are directed out of the region between each shield 10 and the adjacent seal 14, as discussed below. Having described the basic structure and functions above, these and other details of the present shield 10 are described in additional detail below.

Figure 2:
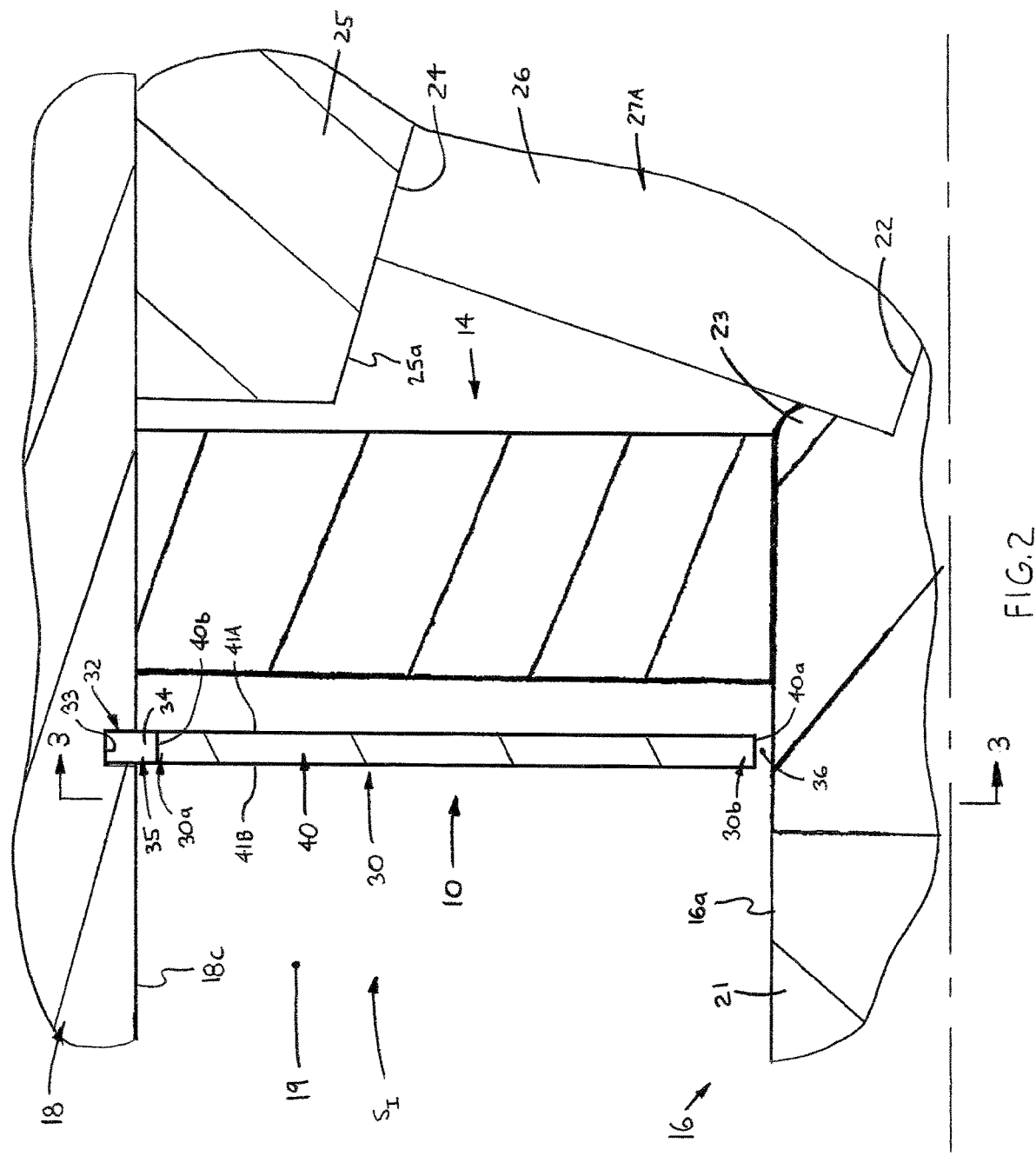
FIG. 2 is a more enlarged, axial cross-sectional view of an outboard portion of FIG. 1.
Figure 7:
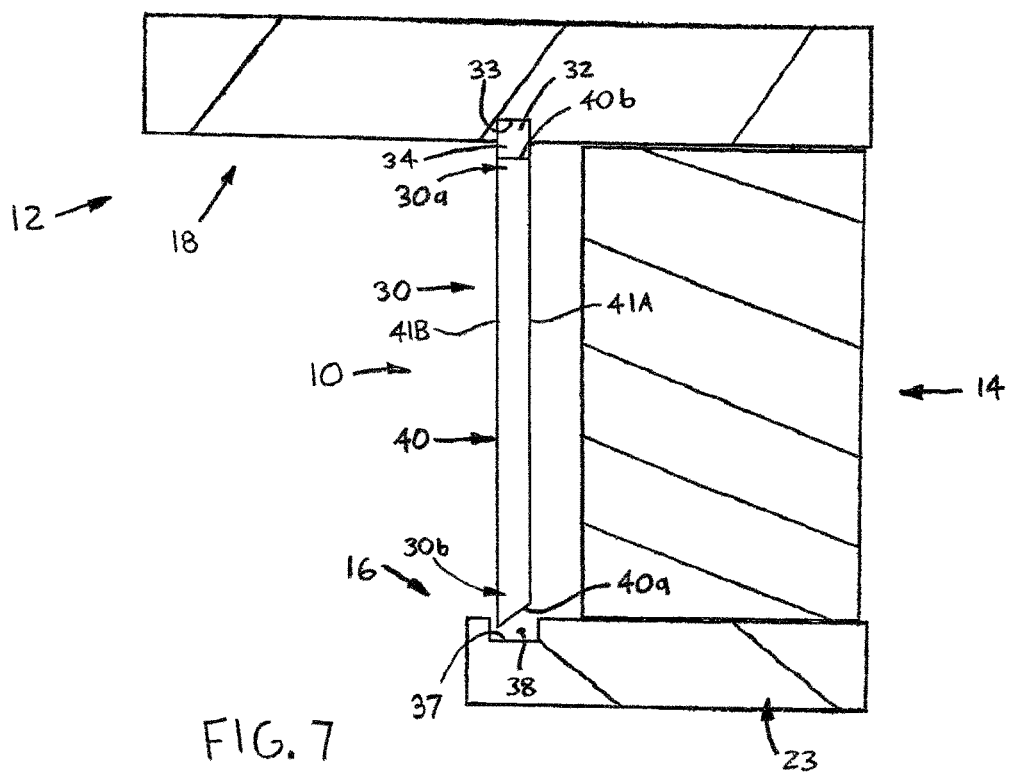
FIG. 7 is another axial cross-sectional view of the first construction shield, shown with an inner radial end of a shield annular body disposed within a groove of the bearing inner ring.

Referring to FIGS. 3-8, in a first, most basic construction, the rigid annular body 30 is formed as a substantially flat circular disk 40 having inner and outer circular edges 40*a*, 40*b*, respectively, and opposing radial surfaces 41A, 41B. The inner circular edge 40*a* defines the body central opening 31 and the preferred plurality of couplers 32 are spaced circumferentially about, and each extend radially outwardly from, the outer circular edge 40*b* of the circular disk 40. As discussed above, the inner circular edge 40*a* of the disk 40 may be spaced radially outwardly from the inner axle 16, the inner ring 23, the nut 21 or the washer 28 to define the annular labyrinth gap 36, as depicted in FIGS. 2, 3 and 6, or disposed within the groove 37 formed in the particular component and defining the U-shaped labyrinth gap 38, as shown in FIG. 7. Further, the disk radial surface 41A facing the seal 14 is configured to direct substances, i.e., contaminants, contacting the disk 40 generally radially outwardly and into the drain passages 34 by centrifugal force during rotation of the outer hub 18.

Figure 8:
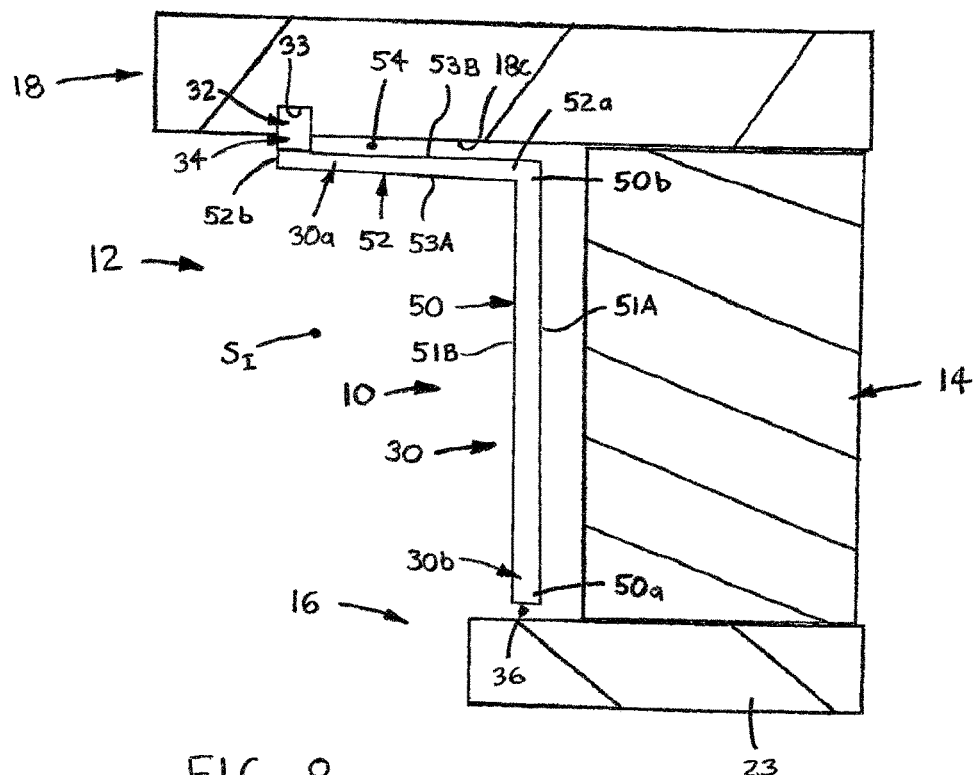
FIG. 8 is an axial cross-sectional view of a second construction shield disposed between the bearing inner ring and the outer hub and having an annular body with an outer axial portion, the shield body having an inner radial end spaced outwardly from the bearing inner ring.
Figure 9:
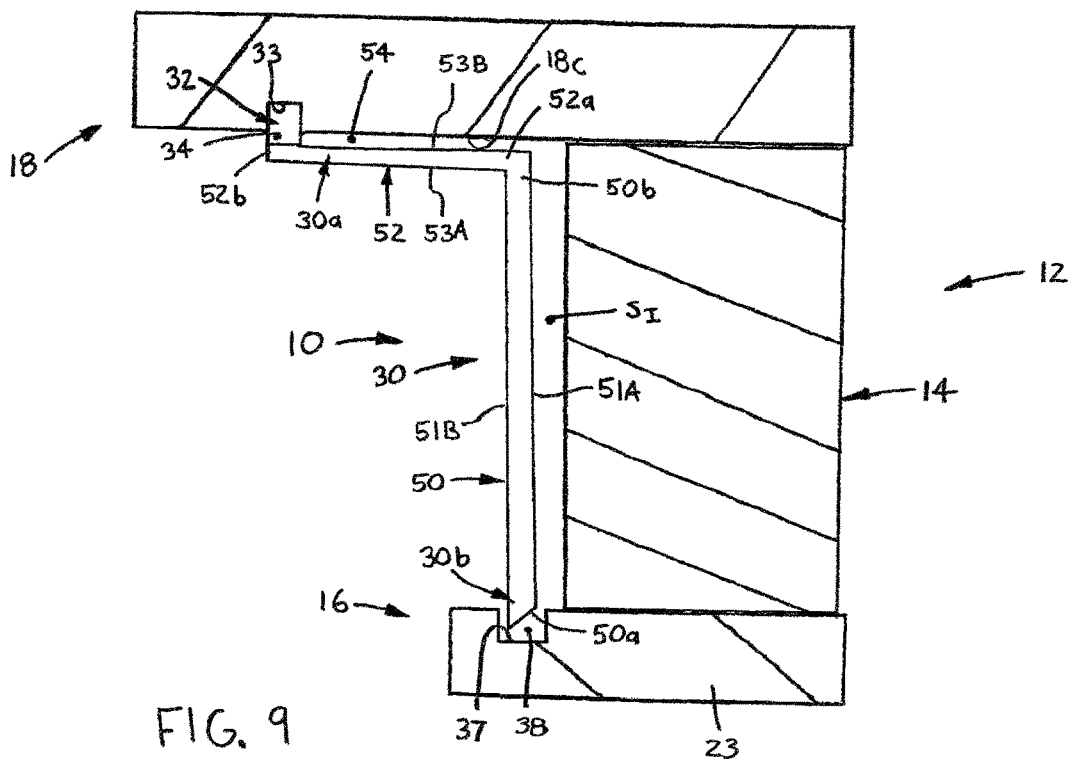
FIG. 9 is another axial cross-sectional view of the second construction shield, the shield body having an inner radial end disposed within a groove of the bearing inner ring.
Figure 10:
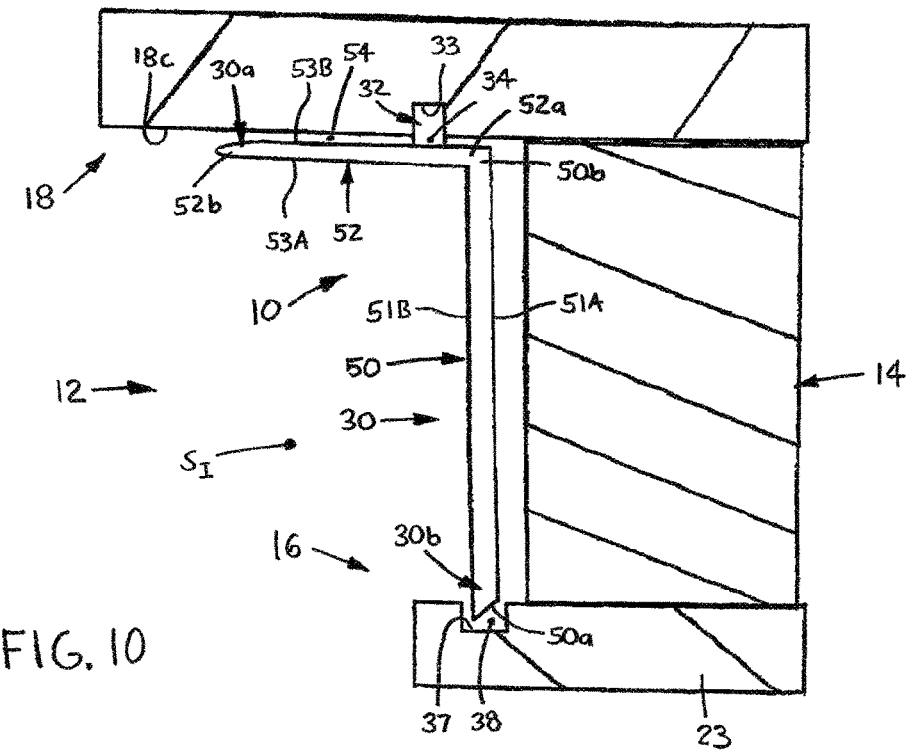
FIG. 10 is another axial cross-sectional view of the second construction shield, shown with couplers located centrally on a body outer axial portion and with the body inner radial end being disposed within a groove of the bearing inner ring.

Referring to FIGS. 8-10, in a second construction, the rigid annular body 30 is formed to include a radial portion 50 providing the central opening 31 and an outer axial portion 52 providing the body outer radial end 30*b* and extending axially from the radial portion 50 in a direction generally away from the seal 14. Specifically, the radial portion 50 includes inner and outer circular edges 50*a*, 50*b*, the inner edge 50*b* defining the central opening 31, and opposing radial surfaces 51A, 51B. The inner radial edge 50*a* may be spaced outwardly from the axle 16 or a component 21, 23 or 28 disposed thereon or within an annular groove 37 formed therein, and the radial surface 51A is configured to direct substances radially outwardly and into the drain passages 34 during hub rotation.

Further, the body axial portion 52 is generally cylindrical and has a first axial end 52*a* integrally formed with the outer circular edge 50*b* of the radial portion 50, a second, free axial end 52*b*, and inner and outer circumferential surfaces 53A, 53B. The outer circumferential surface 53B of the axial portion 52 is spaced radially inwardly of the hub inner surface 18*c* or the outer ring inner surface 25*a* so as to define an outer annular labyrinth gap 54, which functions both as a labyrinth seal to prevent ingress of contaminants and leads into the drain passage(s) 34. Furthermore, the preferred plurality of couplers 32 extend radially outwardly from the outer axial portion 52 and may be positioned at least generally adjacent to the second, free axial end 52*b*, as shown in FIGS. 8 and 9, generally adjacent to the first axial end 52*a* (not shown) or at an axial position between the two ends 52*a*, 52*b*, as depicted in FIG. 10.

Figure 11:
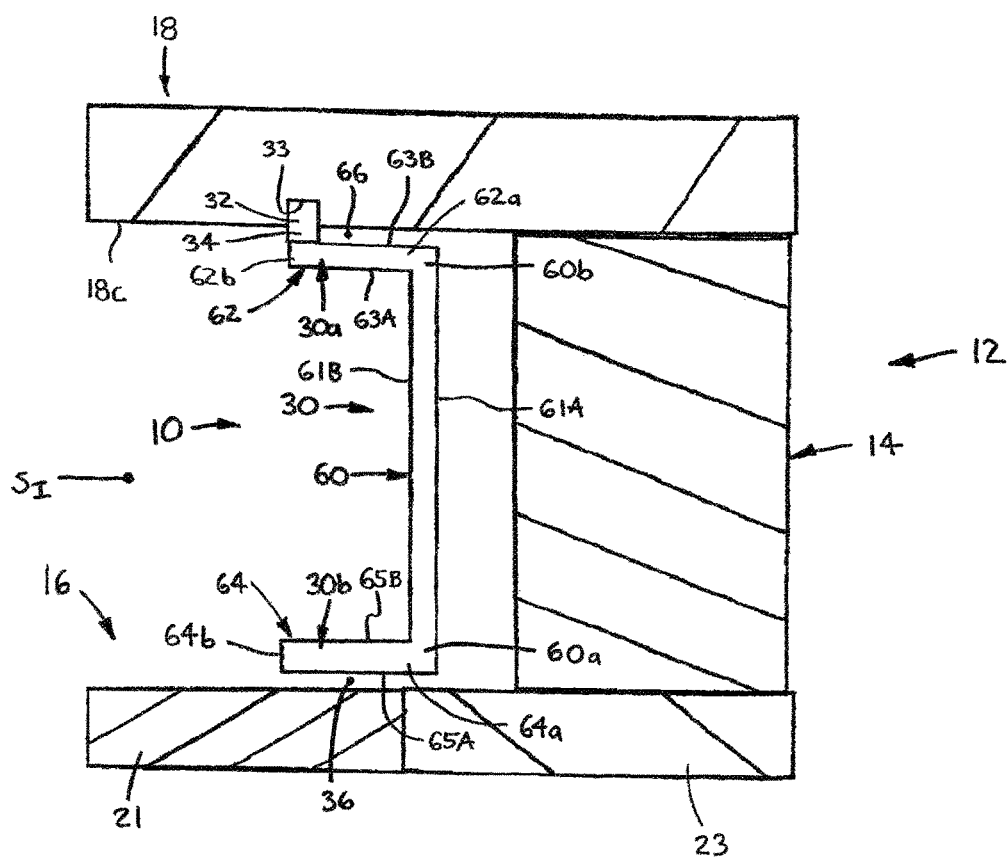
FIG. 11 is an axial cross-sectional view of a third construction shield disposed between the bearing inner ring and the outer hub and having an annular body with an outer axial section and an inner axial section.

Referring particularly to FIG. 11, a third construction of the shield 10 has a rigid annular body 30 with a radial portion 60 providing the central opening 31, an outer axial portion 62 providing the body outer radial end 30*b* and an inner axial portion 64 providing the body inner radial end 30*a*, each axial portion 62, 64 extending axially from the radial portion 60 in a direction generally away from the seal 14. Specifically, the radial portion 60 includes inner and outer circular edges 60*a*, 60*b* and opposing radial surface sections 61A, 61B. The outer axial portion 62 is generally cylindrical and has a first axial end 62*a* integrally formed with the outer circular edge 60*b* of the radial portion 60, a second, free axial end 62*b*, and inner and outer circumferential surfaces 63A, 63B. The outer circumferential surface 63B of the outer axial portion 62 is spaced radially inwardly of the hub inner surface 18*c* or outer ring inner surface 25*a* so as to define an outer annular labyrinth gap 66, and the preferred plurality of couplers 32 extend radially outwardly from the outer axial portion 62. Further, the inner axial portion 64 is also generally cylindrical and has a first axial end 64*a* integrally formed with the inner circular edge 60*a* of the radial portion 60, a second, free axial end 64*b*, and inner and outer circumferential surfaces 65A, 65B. The inner circumferential surface 65B of the inner axial portion 64 is spaced radially outwardly of the inner axle 16 or a component 21, 23 or 28 disposed thereon so as to form the annular gap 36 with an extended length.

Figure 12:
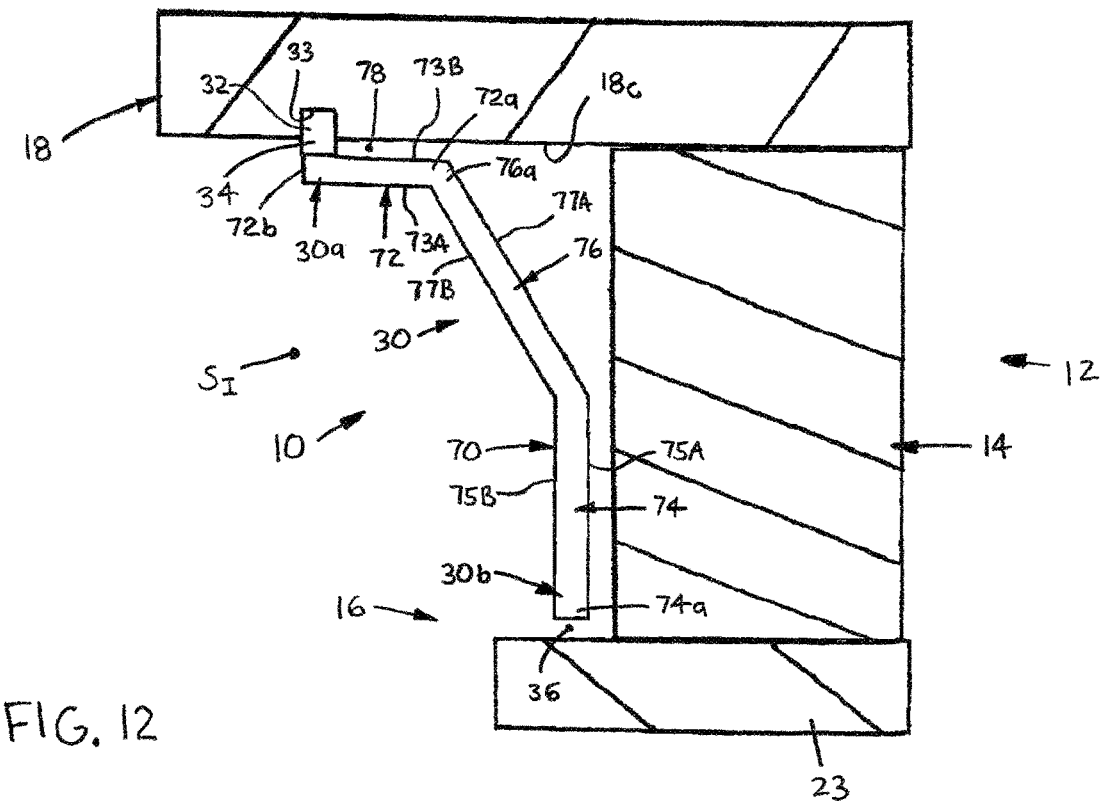
FIG. 12 is an axial cross-sectional view of a fourth construction shield disposed between the bearing inner ring and the outer hub and having an annular body with a radial portion, including an inner disk section and an outer frustoconical section, and a cylindrical outer axial portion.
Figure 13:
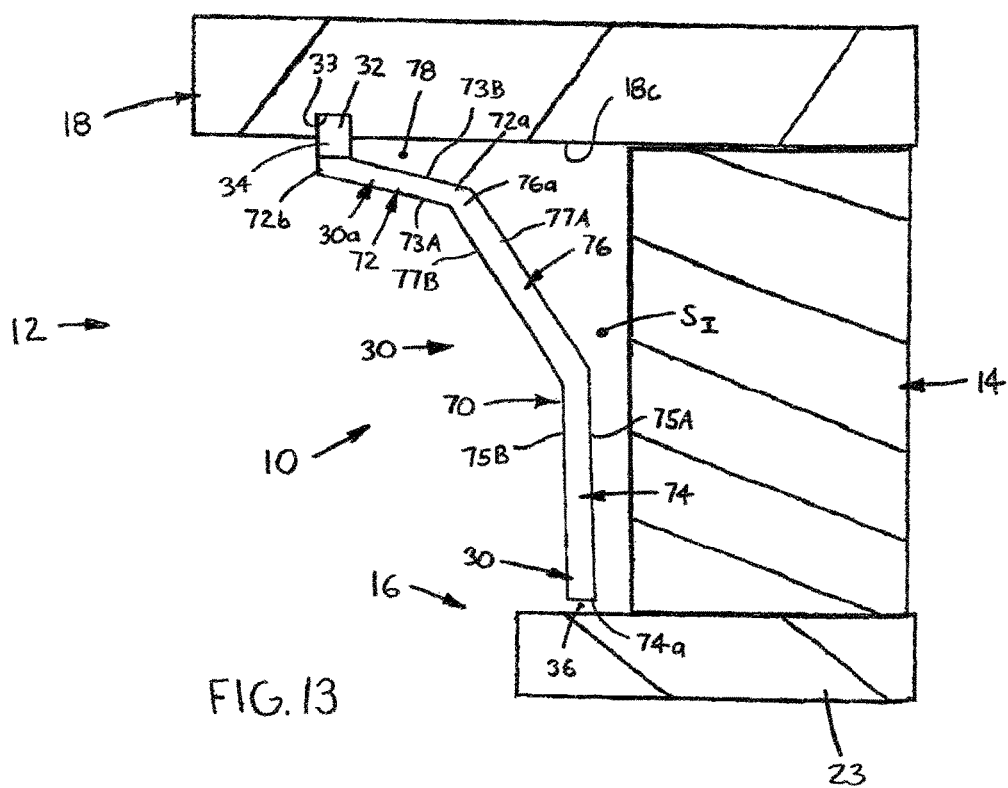
FIG. 13 is another axial cross-section view of the fourth construction shield, shown with a frustoconical outer axial portion spaced from a cylindrical inner surface of the hub.
Figure 14:
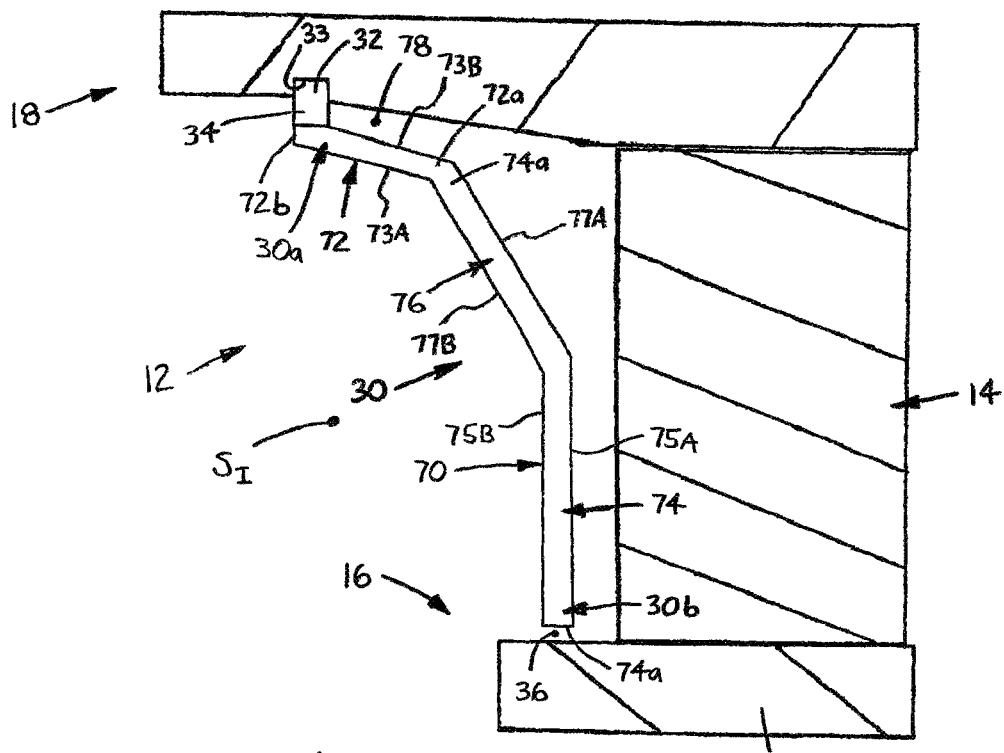
FIG. 14 is another axial cross-section view of the fourth construction shield, shown with a frustoconical outer axial portion spaced inwardly from a tapered inner surface of the hub.
Figure 15:
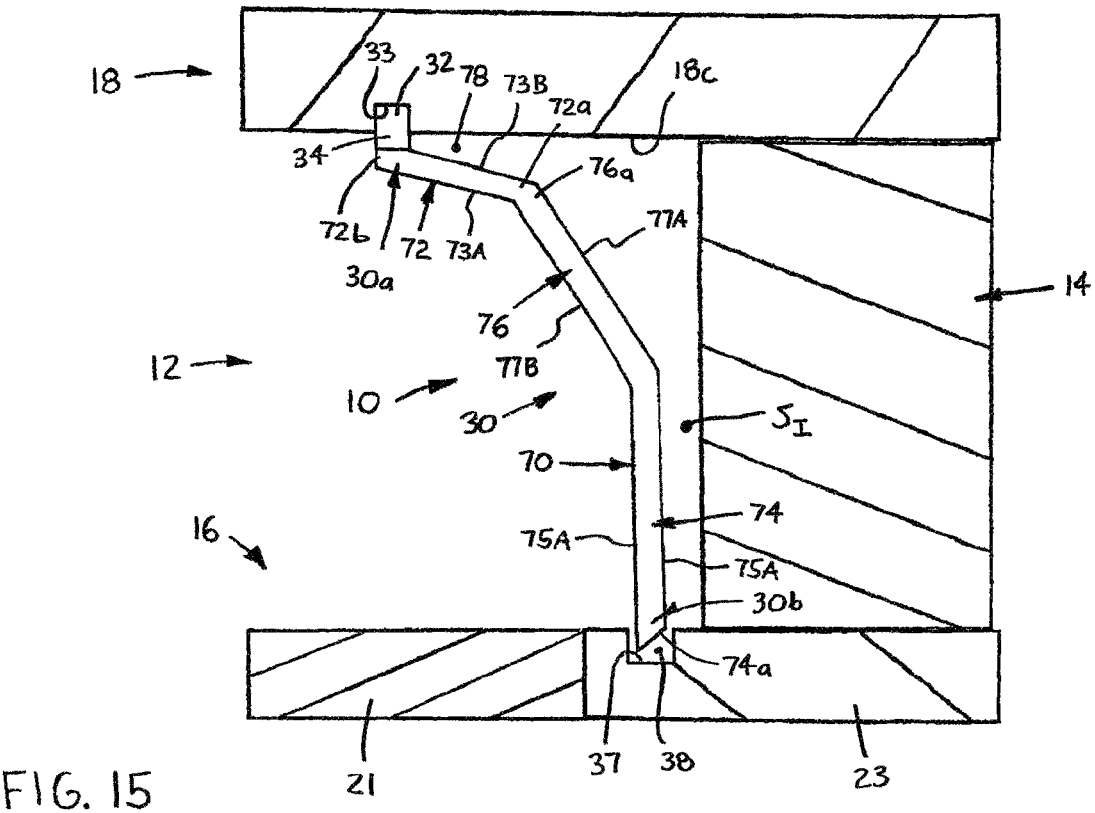
FIG. 15 is another axial cross-sectional view of the fourth construction shield, shown with an inner radial end disposed within a groove of the bearing inner ring.

Referring now the FIGS. 12-15, in a fourth construction of the shield 10, the rigid annular body 30 includes a radial portion 70 and an outer axial section 72, the radial portion 70 having an inner disk section 74 and an outer frustoconical section 76. The disk section 74 of the radial portion 70 has an inner circular edge 74a providing the body inner radial end 30b, which defines the body central opening 31, and opposing radial surfaces 75A, 75B. The disk section inner edge 74a is either spaced radially outwardly from the inner axle 16 and forms the annular labyrinth gap 36, as shown in FIGS. 12-14, or is disposed with an annular groove 37 and forms the U-shaped labyrinth gap 38 as depicted in FIG. 15. Further, the frustoconical section 76 of the radial portion 70 has an outer radial edge 76a and opposing inclined radial surfaces 77A, 77B, and is configured to direct substances or contaminants contacting the radial surface 77A radially and axially toward the drain passages 34 during rotation of the outer hub 18.

Further, the body axial portion 72 extends axially from the radial portion 70 in a direction generally away from the seal 14 and has a first axial end 72a integrally formed with the outer radial edge 76a of the frustoconical section 76, an opposing second axial end 72b and opposing circumferential surfaces 73A, 73B. The outer circumferential surface 73B of the outer axial portion 72 is spaced radially inwardly of the hub inner surface 18c or the outer ring inner surface 25a so as to define an outer annular labyrinth gap 78, and the preferred plurality of couplers 32 extend radially outwardly from the axial portion 72. The outer axial portion 72 may be formed generally cylindrical, as shown in FIG. 12, or formed generally frustoconical so as to direct substances both radially and axially through the drain passages 34, as depicted in FIGS. 13-15.

Figure 16:
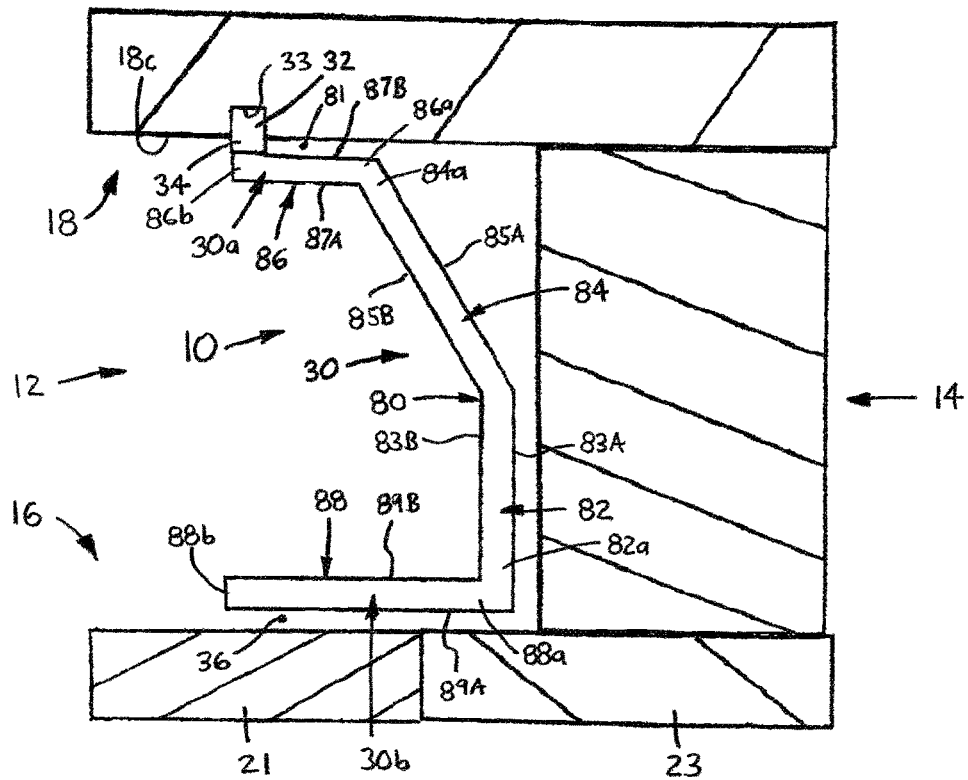
FIG. 16 is an axial cross-sectional view of a fifth construction shield disposed between the bearing inner ring and the outer hub and having an annular body with a radial portion, including an inner disk section and an outer frustoconical section, and having both a cylindrical outer axial portion and a cylindrical inner axial portion.
Figure 17:
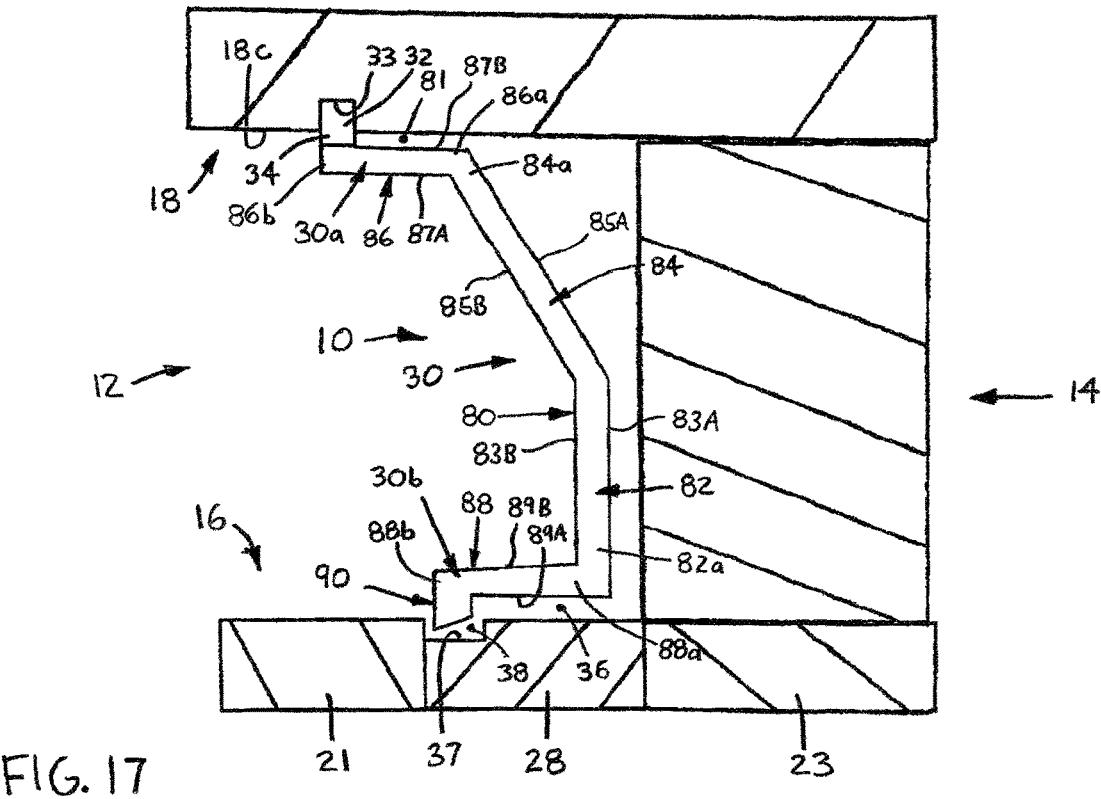
FIG. 17 is another axial cross-sectional view of the fifth construction shield, further including an inner radial portion extending inwardly from the inner axial portion and into a groove on the bearing inner ring.

Referring to FIGS. 16 and 17, a fifth construction of the rigid annular body 30 includes a radial portion 80 with an inner disk section 82 and an outer frustoconical section 84, an outer axial portion 86 and an inner axial portion 88, each axial portion 82, 84 extending axially from the radial portion 80 in a direction generally away from the seal 14. The disk section 82 has an inner end 82a and opposing radial surfaces 83A, 83B and the frustoconical section 84 has an outer radial end 84a and opposing inclined radial surfaces 85A, 85B and is configured to direct substances or contaminants contacting the radial surface 85A radially and axially toward the drain passages 34 during rotation of the outer hub 18. The outer axial portion 86 is generally cylindrical and has a first axial end 86a integrally formed with the outer end 84a of the radial portion frustoconical section 84, a second, free axial end 86b, and inner and outer circumferential surfaces 87A, 87B. The outer circumferential surface 87B of the axial portion 86 is spaced radially inwardly of the hub inner surface 18c or outer ring inner surface 25a so as to define an outer annular labyrinth gap 81.

Further, the inner axial section 88 is also generally cylindrical and has a first axial end 88a integrally formed with an inner circular edge 82 of the disk section 82, an opposing second axial end 88b, and inner and outer circumferential surfaces 89A, 89B. The inner circumferential surface 89A of the inner axial portion 88 is spaced radially outwardly of the inner axle 16 or a component 21, 23 or 28 disposed thereon so as to form the annular gap 36 with an extended length. Also, as depicted in FIG. 17, the annular body 30 may further include an inner radial portion 90 extending radially inwardly from the second axial end 88b of the inner axial portion 88. The inner radial portion 90 is disposed in an annular groove 37 in the axle 16, or a component 21, 23 or 28 on the axle 16, to provide the U-shaped labyrinth gap 38 leading into the main annular gap 36.

Although five basic constructions of the rigid annular body 30 of the shield 10, and variations thereof, are described and depicted herein, the scope of the present invention includes these and any other construction of the annular body 30 having an outer radial end 30a coupleable with a rotatable outer hub and an inner radial end 30b located radially adjacent to an inner axle so as to obstruct an annular space between the hub and axle.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A wheel bearing assembly comprising:
   a fixed inner axle having a central axis and at least one bearing inner race;
   a rotatable outer hub having a central bore, the axle being disposed within the hub central bore such that an annular interior space is defined between the inner axle and the outer hub, and at least one bearing outer race disposed radially about the at least one bearing inner race;
   a plurality of rolling elements disposed between the at least one inner race and the at least one outer race so as to rotatably couple the outer hub with the inner axle;
   an annular seal disposed between the inner axle and the outer hub and located adjacent to the inner race and to the outer race; and
   a shield spaced axially from the seal such that the seal is disposed between the plurality of rolling elements and the shield, the shield including a rigid annular body having an outer radial end coupled with the outer hub so as to define at least one drain passage between the rigid annular body and the hub and an inner radial end, the inner radial end defining a central opening for receiving the axle and being located adjacent to the inner axle or a component disposed upon the axle such that the annular body is configured to obstruct a section of the annular interior space to prevent substances from contacting the seal, the rigid annular body including an outer frustoconical section extending in a direction radially outwardly and axially away from the seal and configured such that centrifugal force during rotation of the hub directs substances contacting the frustoconical section away from the seal and toward the at least one drain passage.

2. The wheel bearing assembly as recited in claim 1 wherein the shield further includes at least one coupler connected with the outer radial end of the rigid annular body and configured to connect the rigid annular body with the outer hub such that the at least one drain passage is defined between the rigid annular body and the outer hub.

3. The wheel bearing assembly as recited in claim 2 wherein one of:
the outer hub includes an annular groove extending outwardly from the inner circumferential surface of the outer hub, at least a portion of the at least one coupler being disposed within the annular groove to couple the shield with the outer hub; and
the at least one coupler is frictionally engaged with the inner circumferential surface of the outer hub to couple the shield with the hub.

4. The wheel bearing assembly as recited in claim 2 wherein the shield at least one coupler includes a plurality of the couplers spaced circumferentially about the outer radial end of the rigid annular body.

5. The wheel bearing assembly as recited in claim 1 wherein one of:
the rigid annular body includes a radial portion providing the central opening and an axial portion providing the annular body outer radial end;
the rigid annular body includes a radial portion providing the annular body outer radial end and an axial portion providing the annular body inner radial end and defining the central opening; and
the rigid annular body includes a central radial portion, an outer axial portion providing the annular body outer radial end and an inner axial portion providing the annular body inner radial end and defining the central opening.

6. The wheel bearing assembly as recited in claim 5 wherein an annular labyrinth gap is defined between each axial portion of the shield annular body and the inner circumferential surface of the hub or the outer circumferential surface of the axle.

7. The wheel bearing assembly as recited in claim 5 wherein each axial portion of the rigid annular body is cylindrical or frustoconical.

8. The wheel bearing assembly as recited in claim 1 wherein the rigid annular body includes a central radial portion and at least one of:
an inner axial portion extending axially away from the seal and defining an inner annular labyrinth gap between the inner axial portion and the outer circumferential surface of the axle; and
an outer axial portion extending axially away from the seal and defining an outer annular labyrinth gap between the outer axial portion and the inner circumferential surface of the hub.

9. The wheel bearing assembly as recited in claim 1 wherein the shield further comprises at least one coupler connected with the outer radial end of the rigid annular body and configured to connect the rigid annular body with the outer hub such that at least one drain passage is defined between the rigid annular body and the outer hub, the frustoconical section directing substances toward the at least one drain passage.

10. The wheel bearing assembly as recited in claim 1 wherein:
the inner axle has an annular groove extending radially inwardly from a section of the outer circumferential surface of the inner axle and being formed in the axle or in one of a bearing inner ring, a washer and a nut disposed about the axle; and
at least a portion of the inner radial end of the annular body is disposed within the annular groove such that a U-shaped labyrinth gap is defined between the portion of the inner end of the annular body and the inner axle.

11. A wheel bearing assembly comprising:
a fixed inner axle having a central axis and at least one bearing inner race;
a rotatable outer hub having an inner surface defining a central bore, the axle being disposed within the hub central bore such that an annular interior space is defined between the inner axle and the outer hub, the outer hub having at least one bearing outer race disposed radially about the at least one bearing inner race;
a plurality of rolling elements disposed between the at least one inner race and the at least one outer race so as to rotatably couple the outer hub with the inner axle;
an annular seal disposed between the inner axle and the outer hub and located adjacent to the inner race and to the outer race; and
a shield spaced axially from the seal such that the seal is disposed between the plurality of rolling elements and the shield, the shield including a rigid annular body having an outer radial end and an inner radial end, the inner radial end defining a central opening for receiving the axle and located adjacent to the inner axle or a component disposed about the axle, and at least one coupler connected with the annular body outer end and configured to connect the annular body with the outer hub such that at least one drain passage is defined between the rigid annular body and the outer hub, the rigid annular body including an outer axial portion providing the annular body outer radial end, extending axially from a remainder of the rigid annular body and spaced radially inwardly from the inner surface of the outer hub so as to define an annular labyrinth gap between the outer axial portion and the hub inner surface.

12. The wheel bearing assembly as recited in claim 11 wherein one of:
the outer hub includes an annular groove extending outwardly from the inner circumferential surface of the outer hub, at least a portion of the at least one coupler being disposed within the annular groove to couple the shield with the outer hub; and
the at least one coupler is frictionally engaged with the inner circumferential surface of the outer hub to couple the shield with the hub.

13. The wheel bearing assembly as recited in claim 11 wherein the shield at least one coupler includes a plurality of the couplers spaced circumferentially about the outer radial end of the rigid annular body.

14. The wheel bearing assembly as recited in claim 11 wherein the rigid annular body includes at least one frustoconical section configured to direct substances contacting the frustoconical section radially and axially toward the at least one drain passage during rotation of the hub.

15. The wheel bearing assembly as recited in claim 11 wherein one of:
the rigid annular body includes a radial portion providing the central opening; and the rigid annular body includes a central radial portion and an inner axial portion providing the annular body inner radial end and defining the central opening.

16. The wheel bearing assembly as recited in claim 15 wherein at least one of:
   an annular labyrinth gap is defined between the inner axial portion of the rigid annular body and the outer circumferential surface of the axle; and
   each axial portion of the rigid annular body is cylindrical or frustoconical.

17. The wheel bearing assembly as recited in claim 11 wherein the rigid annular body includes a central radial portion and:
   an inner axial portion extending axially away from the seal and defining an inner annular labyrinth gap between the inner axial portion and the outer circumferential surface of the axle.

18. The wheel bearing assembly as recited in claim 11 wherein the central radial portion of the annular body includes an inner disk section and at least one frustoconical section extending between the central radial portion and the outer axial portion, the at least one outer frustoconical section being configured to direct substances contacting the frustoconical section generally radially outwardly and axially away from the seal during rotation of the hub.

19. The wheel bearing assembly as recited in claim 11 wherein:
   the inner axle has an annular groove extending radially inwardly from a section of the outer circumferential surface of the inner axle and being formed in the axle or in one of a bearing inner ring, a washer and a nut disposed about the axle; and
   at least a portion of the inner radial end of the annular body is disposed within the annular groove such that a U-shaped labyrinth gap is defined between the portion of the inner end of the annular body and the inner axle.

* * * * *